United States Patent [19]

Mezger et al.

[11] Patent Number: 5,696,316
[45] Date of Patent: Dec. 9, 1997

[54] ADAPTION DEVICE FOR TRANSMITTER WHEEL OF COMBUSTION ENGINE

[75] Inventors: Manfred Mezger, Markgroeningen; Martin Klenk, Backnang; Heinz Böhmler, Pleidelsheim; Karsten Mischker, Leonberg; Klaus Ries-Müller, Rappenau; Wolfgang Wimmer, Erlenbach, all of Germany

[73] Assignees: Robert Bosch GmbH, Stuttgart; Audi AG, Ingolstadt, both of Germany

[21] Appl. No.: 553,655

[22] PCT Filed: Feb. 16, 1995

[86] PCT No.: PCT/DE95/00201

§ 371 Date: Nov. 20, 1995

§ 102(e) Date: Nov. 20, 1995

[87] PCT Pub. No.: WO95/23974

PCT Pub. Date: Sep. 8, 1995

[30] Foreign Application Priority Data

Mar. 1, 1994 [DE] Germany ............... 44 06 606.6

[51] Int. Cl.$^6$ ............... G01P 03/48; G01D 01/02; F02D 41/00
[52] U.S. Cl. ............... 73/116; 364/431.03; 364/431.07
[58] Field of Search ............... 73/116, 117.2, 73/117.3, 118.1; 364/431.03, 431.04, 431.07

[56] References Cited

U.S. PATENT DOCUMENTS

| | | | |
|---|---|---|---|
| 4,216,419 | 8/1980 | Van Dam et al. | 318/327 |
| 4,989,448 | 2/1991 | Fukui et al. | 73/116 |
| 5,041,980 | 8/1991 | Maddock et al. | 73/116 |
| 5,117,681 | 6/1992 | Dosdall et al. | 73/116 |
| 5,197,325 | 3/1993 | Tamura et al. | 73/117.3 |
| 5,311,771 | 5/1994 | Young | 73/117.3 |
| 5,377,535 | 1/1995 | Angermaier et al. | 73/116 |
| 5,377,536 | 1/1995 | Angermaier et al. | 73/116 |
| 5,418,932 | 5/1995 | Watabe et al. | 364/431.04 |
| 5,434,800 | 7/1995 | Davis et al. | 364/431.04 |
| 5,471,869 | 12/1995 | Kuroda et al. | 73/117.3 |
| 5,505,079 | 4/1996 | Rossignol | 73/116 |
| 5,522,256 | 6/1996 | Hashimoto et al. | 73/116 |
| 5,528,929 | 6/1996 | Ikebuchi | 73/116 |
| 5,528,931 | 6/1996 | James et al. | 73/117.3 |
| 5,531,108 | 7/1996 | Feldkamp et al. | 73/117.3 |
| 5,559,705 | 9/1996 | McClish et al. | 73/117.3 |

FOREIGN PATENT DOCUMENTS

| | | |
|---|---|---|
| 4009285 | 12/1990 | Germany . |
| 4138765 | 7/1992 | Germany . |
| 4133679 | 4/1993 | Germany . |

*Primary Examiner*—George M. Dombroske
*Attorney, Agent, or Firm*—Michael J. Striker

[57] ABSTRACT

A transmitter wheel is used for example to detect speed changes of an internal combustion engine with high precision in order to calculate a running imbalance value from them. A transmitter wheel of this kind has for example three segments, which are ideally the same length, but in reality usually have lengths which differ slightly from one another. In order to prevent measurement errors which are caused by this, it is known to determine the actual lengths by means of an adaption process. The device according to the invention is embodied such that for each segment, it has a plurality of adaption filters to detect different adaption values for different speed ranges. It has namely turned out that in different speed ranges, different lengths are measured, which is an error that must be compensated for since the length of a segment is in fact actually constant.

18 Claims, 4 Drawing Sheets

5,696,316

ADAPTION DEVICE FOR TRANSMITTER WHEEL OF COMBUSTION ENGINE

BACKGROUND OF THE INVENTION

The invention relates to a device for adaption of tolerances in measurement of angular segment lengths of a segmented transmitter wheel which is affixed for example to the crankshaft of an internal combustion engine.

A device of this type is known from document DE-A-41 33 679. The device described there also has a learning progress determining device, as well a comparison device.

A transmitter wheel of an internal combustion engine can be calibrated such that it supplies a measurement signal via a transducer whenever a respective piston is situated in its upper dead center. To this end, a transmitter wheel in a six cylinder engine has three teeth which each extend over 60° as well as three sections which are disposed between the teeth, have a low wheel diameter, and likewise each extend over 60°. At each ascending and descending tooth edge, the transducer supplies a measurement signal. In the above described function, the above described transmitter wheel has six segments. If only the rising tooth edges are taken into account in the same transmitter wheel, it has three segments, each with a length of 120°. For the sake of simplicity, only a transmitter wheel with three segments is referred to below. The number of segments and their positions are not important to the invention.

If the transmitter wheel turns at a certain speed and the duration between two segments beginnings is determined by counting time pulses, the count value of 100 might be produced, for example, for each segment of an ideal transmitter wheel, thus the total count value would be 300 for one complete revolution of the transmitter wheel. In actual use, though, due to varying tolerances, irregular count values are obtained, for example the count value 101 for the first segment, the count value 97 for the second segment, and the count value 102 for the third segment. If the measurement signals which are generated with the help of the transmitter wheel are required for precise processing algorithms, these actual segment lengths must be taken into account instead of the ideal ones. In addition, an adaption is required, which in the exemplary case, starts from the count value of 100 for each segment, but then adapts to the above-mentioned precise values. If the segment lengths at a fixed speed are precisely measured in this manner, then these precisely determined segment lengths can then be used to very precisely determine speed changes of the transmitter wheel by means of new time measurements.

It can easily be seen from the above example that when there is a fixed timing cycle, the count value obtained for a segment length depends on the speed of the transmitter wheel. In order to be independent of the speed with regard to the length of a segment, it is useful to carry out a standardization procedure. This can be done, for example, with reference to the count value for one complete revolution. In the above example, each ideal segment would then have the length 100/300, while in the real transmitter wheel of the example, the individual segments would have the lengths 101/300, 97/300, or 102/300. A certain one of the segments, though, can be referred to so that for example the first segment has the length 101/101, the second has the length 97/101, and the third has the length 102/101. This is particularly possible when no absolute measurement of speed is required, but it is sufficient to determine a percentage speed change. It is furthermore possible to arbitrarily set the length of any segment to one and to determine the length difference of the other segments from this chosen segment. In the exemplary case, this means that the second segment is 4/101 shorter than the first and in comparison, the third segment is 1/101 longer than the first.

It should be noted that it is quite unimportant to the invention how the length of a segment is detected, i.e. whether absolutely or relatively, whether with reference to one complete revolution or a chosen segment, or whether as a difference.

With the device described in the above-mentioned document DE-A-41 33 679, a reference segment is chosen as a unit segment, and the lengths of the other segments are characterized by differences in relation to this unit length. In the description below, though, for the sake of simplicity, it is assumed that the lengths of three respective segments are detected in the same manner, namely with reference to the time which the transmitter wheel requires for each complete revolution.

Up to now it has been assumed that the segment lengths are detected at constant speed with the help of a time measurement. Experience has shown, though, that speed is never constant, which must be taken into consideration when measuring segment lengths. If the above-mentioned 300 cycles are counted in a first revolution, but 303 cycles are counted in a second revolution of the transmitter wheel, then one can assume for example that the speed would have correspondingly increased one cycle over each segment. This one cycle has to then be subtracted from the actual measured length. In the above-mentioned exemplary case, with a somewhat accelerated revolution of the transmitter wheel, for the first segment, not 101, but 102 cycles would be yielded, from which one cycle would have to be subtracted so that the correct value of 101 cycles would be obtained once more (which would then additionally have to be referred to the 300 cycles for one complete revolution). A simple linear conversion of this kind is described in the above-mentioned document DE-A-41 33 679. However, more-expensive speed correction processes can be used, as described for example in the documents DE-A-40 09 285 and DE-A-41 38 765, in connection with the detection of running imbalance values. It should be noted that it is unimportant for the invention how speed changes are taken into account when detecting corrected measurement signals.

The above-mentioned adaption is carried out with the corrected measurement signals. An adaption is fundamentally nothing other than the fact that a value is adapted to an average of a value, which varies relatively widely. Producing the average can be carried out in an arbitrary manner, for example by producing the mathematical average of a large number of measured values, by finding the median, or in the procedure which is used almost exclusively in digital data processing, by using a first-order filter, which works so that, in order to produce a new average, it adds a new measured value which has only a very low weighting to the prior average. This latter adaption is also described in the document DE-A 41 33 679. However, the adaption algorithm is unimportant to the invention.

When carrying out adaption processes, it is generally of interest to learn how far learning has already progressed since the beginning of the process. The simplest device which can be used to detect the learning progress is an adaption step counter, which simply counts how frequently the adaption value has already been changed by new measured values in the average production. For each kind of application, by means of practical tests, a threshold number, from which point on one can be confident that the adaption value precisely represents the actual conditions, can be determined. Another possibility is to test the change of the adaption value for a given number of adaption steps since it is known that an adaption value changes especially markedly whenever it is still far removed from the end value; on the other hand, it hardly changes further if it almost agrees with the end value already. A further variant is indicated in the document DE-A-41 33 679, namely an average production in the form of a first-order filter, which filters the difference between the actual adaption value and the actual measured value. In the ideal case, the initial value of the learning filter approaches the value zero. In actual use, a success signal for sufficient learning is already output once the initial value of the filter, that is the learning progress signal, falls below a given threshold value.

A very precise adaption for the lengths of the segments of a transmitter wheel is required primarily when the segment lengths are used to very precisely detect speed changes caused, for example, by misfires. A so-called running imbalance value is calculated from this kind of speed changes, for which purpose algorithms can be used, as generally outlined in the above-mentioned documents DE-A-40 09 285 and DE-A-41 36 765. In connection with the present invention, it is unimportant how running imbalance values are determined. In order to determine whether excessive misfires are occurring in the internal combustion engine whose crankshaft the above-mentioned transmitter wheel is attached to, the running imbalance value is compared to a threshold value. Ideally, the running imbalance value has the value zero if no misfires whatsoever occur, all speed changes not caused by misfires can be compensated, and finally, exact speed change measurements can be carried out with the help of the transmitter wheel. If all three requirements were ideally fulfilled, the threshold value could have the value zero. In actual use, though, it is different from zero and, as is explained in the document DE-A-41 33 679, can be changed depending on the learning progress in the adaption. If the transmitter wheel, namely, still supplies imprecise measured values at the beginning of an adaption, due to these imprecisions, the running imbalance value alone already reaches a certain magnitude, even when no misfires whatsoever occur. The better the adaption becomes, the smaller the increases of the running imbalance value, which are caused by measurement imprecisions. That is why the threshold value for comparison with the actual running imbalance value can be reduced with progressing adaption or its minimal value can be fixed at an ever lower value. According to the above-mentioned document, the conversion of the above-mentioned threshold value takes place in one step, namely when the success signal for the learning progress is output. At this time, the increase or lower limit of the above-mentioned threshold value is raised.

When the above-mentioned principles are applied, the adaption can achieve a precision of fractions of a thousandth of the length of a segment. However, it has turned out that in practice, this precision is still insufficient to allow the reliable recognition of misfires in an internal combustion engine.

SUMMARY OF THE PRESENT INVENTION

The object of the invention is to disclose a device which is for adaption of tolerances in measurement of angular segment lengths of a segmented transmitter wheel and which supplies even more precise adaption values than previous devices of this kind.

The novel technical principle is that for at least one segment, not only an individual adaption value is detected, but at least two adaption values, which depend on the speed. This principle is based on the knowledge that in actual use, the lengths of the segments of a transmitter wheel are not always measured the same at all speeds. It is apparent, however, that the length of a segment does not change, and hence the engine-speed-conditional change of the measured length has to be corrected, which also has to be taken into account in the adaption.

With the device of the invention each averaging device which carries out an adaption has at least two averaging sub-devices, each associated with one speed range, and each of the averaging sub-devices is associated with a speed instead of a speed range. However, ranges likewise extend around these predetermined speeds. These ranges, though, can overlap, which is taken into account with the help of various weightings.

As explained above, the invention is based on the knowledge that the segment length measurement depends on speed. It has turned out that this dependency is strongly non-linear. Thus, pronounced resonance ranges occur, in which the measurement error, in comparison to ranges without resonance, is a few hundredths of a degree. If this kind of resonance range, which extends for example over a speed range of 200 rpm, is disposed in a range of 1000 rpm, for example, which is associated with an averaging sub-device, problems can occur. If by chance the adaption takes place within the above-mentioned range of 1000 rpm in a sub-range outside the resonance range, an imprecise value applies for the resonance range. The same is correspondingly true if within the range of 1000 rpm, adaption took place by chance in the resonance sub-range and then this value is applied to the other sub-range. In order to counter difficulties which can arise from this, the improvement according to claim 5 provides that a maximal value memory and a minimal value memory for adaption values be used in each averaging sub-device for at least one segment and that the respective differences between the values be produced, as they are stored in maximal value memories and minimal value memories associated with each other. In a range without a resonance sub-range, only a small difference exists between the minimal value and the maximal value, in comparison to a large difference in a range with a resonance sub-range. If a difference over a threshold is determined, different measures can be taken individually or collectively. One measure is to shift the range limits or the reference speed for an averaging sub-device so that the resonance range is detected as separately as possible. In accordance with this measure, it is also possible to introduce additional, smaller ranges if a resonance point lies within a large range. Another measure is to increase the threshold value in a misfire recognition when measuring in a speed range with a resonance sub-range.

Since for each segment length, the device according to the invention determines at least two adaption values for speed ranges which differ from each other, there are many variants for how these differing adaption values can be used in subsequent algorithms which are based on the segment length measurement, such as algorithms for running imbalance recognition. It must be noted here that the adaption does not progress at the same pace in all speed ranges. For example, a typical first range is the speed range from about 1500 rpm to about 3000 rpm. Measured values are detected much more frequently in this range than in all other ranges. As soon as it has been learned so start in this range that a success signal indicates satisfactory learning progress, the mechanical tolerances of the transmitter wheel, which are constant for all speed ranges, are very well adapted. That is why it is advantageous in principle to take the adaption values for the various segment lengths, as they have been learned in the speed range most frequently called upon, and accept them also for the adaption values of the segment lengths in the other speed ranges. Then, only the speed-conditional tolerances have to be adapted in the further adaption in the other speed ranges.

In addition, depending upon the learning progress in the individual speed ranges, the above-mentioned threshold value can be modified for the running imbalance recognition. As long as neither mechanical nor speed-conditional tolerances are adapted, this threshold value must be increased relatively sharply. But if the adaption in one speed range has been carried to its outcome, then an increase of the threshold value for this range (or a limiting of its minimal value) can be omitted. In the remaining ranges, the threshold can be reduced since no further errors occur due to mechanical tolerances, but only speed-conditional tolerances. In the other ranges, the increase of the threshold value is not eliminated until the adaption is carried to its outcome there as well. Alternatively to the above described procedure, when the adaption has been carried to its outcome, one can wait until yet another test is done before eliminating the threshold value increase. The aforementioned test, with the help of a maximal and a minimal value, has to do with whether there is a resonance in a speed range. According to this alternative, the final reduction of the threshold value increase to the value zero is carried out only if it turns out that there is only a relatively small difference for the maximal and minimal value.

DESCRIPTION OF THE PREFERRED EMBODIMENTS

Figure 1:
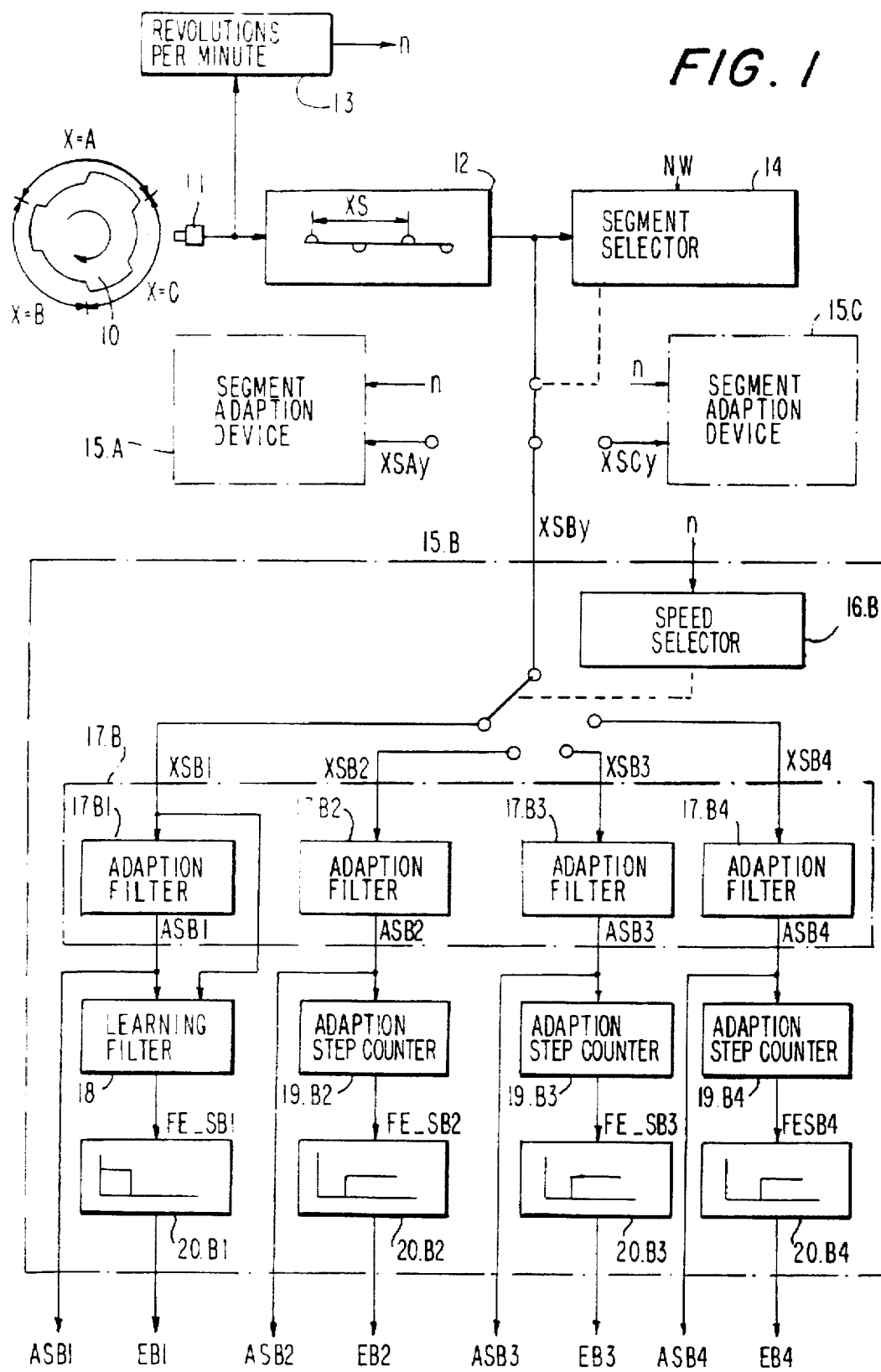
FIG. 1 is a block function diagram of a first adaption device for a transmitter wheel.

Among other things, FIG. 1 shows a transmitter wheel 10 with three teeth, which each extend over 60°, and three gaps of 60° each disposed between them. As a result, three segments A, B, and C are formed, each from one tooth and one gap, which each ideally extend over 120°. Experience has shown, however, that the result is not 120° each, due actually to both mechanical differences of the transmitter wheel and due to speed-conditional tolerances. At the same time, the device shown in FIG. 1 is used to detect the actual length of each of the segments A, B, and C in a manner which is as independent of speed as possible. Values which apply to all segments are indicated in this application with the suffix x so that x can thus have the values A, B, and C.

The tooth edges of the transmitter wheel 10 are scanned by a transducer 11, which outputs a measurement signal to a segment length calculating device 12, which outputs uncorrected segment length values XSxy, which, however, refer to the overall circumference of the transmitter wheel. The above-mentioned measurement signal MS is also supplied to a speed determining device 13, which determines from it the respective actual speed n.

A segment selector 14 determines which segment is just now being measured with the help of the segment length value and a camshaft signal NW or a signal which is output in connection with a gap (not shown) in a segment. Depending upon this, it changes to one of three segment adaption devices 15.A, 15.B, or 15.C. These correspondingly obtain segment length values XSAy, XSBy, or XSCy as well as the respective speed signal n. In FIG. 1, the segment adaption device 15.B for the segment B is shown in detail. Both of the other segment adaption devices 15.A and 15.C are correspondingly constructed.

The segment adaption device 15.B has a speed selector 16.B, four adaption filters 17.B1–17.B4, a learning filter 18, three adaption step counters 19.B2–19.B4, and four comparison devices 20.B1–20.B4.

Figure 3:
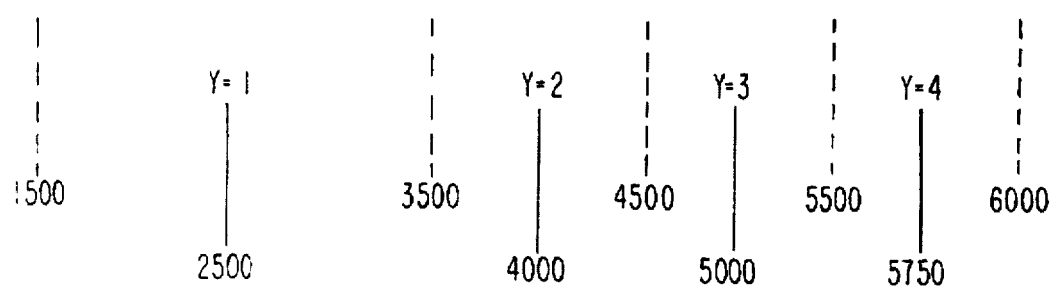
FIG. 3 is a diagram that illustrates speed ranges and weighting factors.
Figure 3:
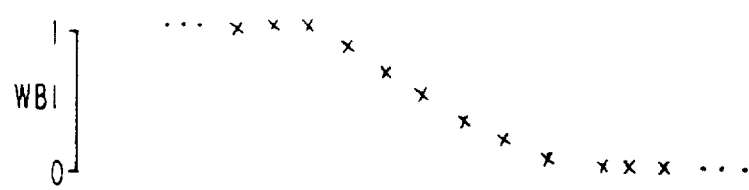
Figure 3:
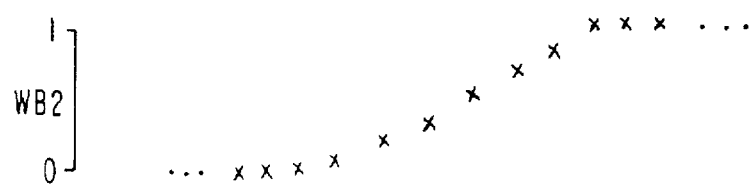

The speed selector 16.B distinguishes between four speed ranges, as illustrated in the top part of FIG. 3. The first range extends from 1500 to 3500 rpm, the second goes to 4500, the third to 5500, the sixth to 6000 rpm. In actual use, the speeds are mostly in the first range. That is why in FIG. 1, the output of the speed selector 16.B is also shown as connected to the first output branch. As a result, the segment length value XSBy is transmitted as value XSB1 for the first speed range. It should be noted that the suffix y hereinafter distinguishes speed ranges or fixed speeds. In all examples, it ranges from 1 to 4, but the invention can be realized with two or more speed ranges or fixed speeds. The more ranges or fixed speeds are used, the better speed influences can be theoretically taken into account in the adaption. In actual use, though, the difficulty arises that several speed ranges are hardly called upon and that is why an adaption takes place there only very slowly. The use of four ranges represents a good compromise between the advantages and disadvantages described.

The segment length value XSB1 is filtered in the adaption filter 17.B1 to generate an adaption value ASB1. As explained at the beginning, this can take place in various ways, for example as described in the document DE-A-41 33 679. A corresponding adaption takes place in the other adaption filters 17.B2–17.B4, in fact in each of the total of four adaption filters for the segment B respectively when the speed selector 16.B is switched to the respective adaption filter, because the speed n is in the corresponding range of the four mentioned above.

The further measures, which are taken inside the segment adaption device 15.B, no longer concern the adaption directly, but instead the detection of the learning progress in the adaption, in order to be able, independently of the learning progress, to take various other measures in connection with values which are provided in connection with the segment length values, for example for use in running imbalance evaluations.

In the learning filter 18, the difference between the adaption value ASB1 and the segment length value XSB1 is subject to a filtration in a first-order filter, as described in the document DE-A-41 33 679. The filtered value FE_SB1 moves toward the value zero. As soon as it has exceeded a given threshold value, the output signal EB1, hereinafter called a success signal, of the comparison device 20.B1 changes from the low level L to the high level H.

In the branches for the ranges 2-4, the learning progress determining devices are not embodied as learning filters, but as adaption step counters 19.B2-19.B4. Each of these counters is incremented by the value one whenever a new adaption step takes place because a new segment length value XSBy is input for the respective range. In the comparison device 20.B2, the count value from the adaption step counter 19.B2 is compared to a threshold value. As soon as the threshold is exceeded, the output signal of the comparison device 20.B2 changes from the level L to the level H. Thus, the success signal EB2 is output. The same is correspondingly true for the comparison devices 20.B3 or 20.B4, which are associated with the adaption step counters 19.B2 and 19.B4.

The most precise determination of the learning result is possible when a learning filter is used as a learning progress determining device in all of the branches respectively. In contrast, the simplest realization is comprised in that only a single adaption step counter is used for all the branches together. If the value of this counter exceeds a first threshold of for example 5000 values for a first speed range, which is called upon the most often, it is assumed that this range is sufficiently adapted; if 3000 new values are now supplied for the second range, the same is assumed for this range; again, if 4000 values are now supplied for the third range, the same is assumed for this range; and if again, 4000 values are now supplied for the fourth range, the same is assumed for this range. The consecutive numbering of the ranges here is not necessarily ordered according to increasing engine speeds, but according to how frequently the successive speed ranges are each typically approached, which is determined beforehand by practical driving tests.

Figure 2:
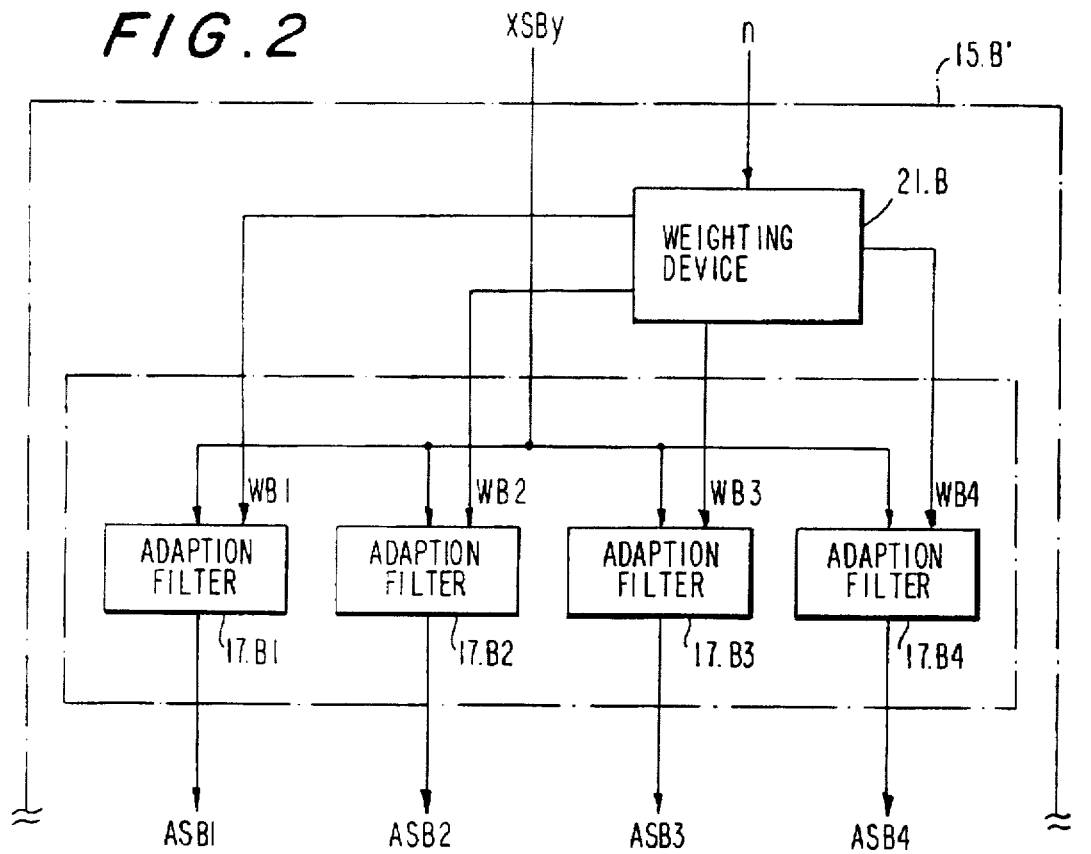
FIG. 2 is a partial block function diagram which illustrates how a second device according to the invention differs from the one according to FIG. 1.

FIG. 2 partially represents a variant 15.B' to the segment adaption device 15.B from FIG. 1; the differences lie in that instead of a speed selector 16.B, there is a weighting device 21.B and that the adaption filters 17.B1–17.B4 are constantly supplied all together with the segment length value XSBy and they additionally each receive a weighting factor WB1-WB4 from the weighting device 21.B. In the first-order filtration in the adaption filters 17.B1–17.B4, these weighting factors WB1-WB4 are used in each case to weight the filter factor with which a new segment length value is taken into account in the filtration. If this filter factor, without weighting or at a weighting factor of 1, is for example 0.004, then it is only 0.002 at a weighting factor of 0.5 and the previous adaption value is taken into account with the weighted factor 0.998 instead of the original weighted factor of 0.996. However, the number of measured values which are enlisted for average production can also be changed for weighting. The function of this device will be explained from the center and bottom parts of FIG. 3.

According to FIG. 3, four speeds are given for the variants from FIG. 2, namely 2500, 4000, 5000, and 5750 rpm. These are each located directly in the center of speed ranges 1–4 for the exemplary embodiment from FIG. 1. If the speed is now 4000 rpm, the weighting factor WB2 has the value 1, while the other weighting factors WB1, WB3, and WB4 have the value 0, which is shown in FIG. 3 for the weighting factor WB1. By comparison, if the speed is 2500 rpm, the weighting factor WB1 has the value 1, while all the others have the value 0. On the other hand, if the speed is about 3500 rpm, an adaption takes place in both the adaption filters 17.B1 and 17.B2, in which the new value is treated with the weighting factor of only 0.5. It is generally true that the weighting factor is larger, the closer the actual speed is to one of the given speeds. The given speeds are preferably chosen such that they do not lie in a range in which the segment length values are distorted by resonance effects. Then resonance sub-ranges are remote from this speed and are therefore only taken into account as values with weaker weighting, which lie around a given speed in a non-resonant sub-range.

In connection with the above described second variant, let it be noted that in the evaluation, the adaption results can also be interpolated. Thus also in the case of the range division used in the variant from FIG. 1, it can be assumed that the adaption value for a respective range is only precisely applicable to the average frequency of the range. If for example the adaption value 1.005 applies for the second range from 3500–4500 rpm, this value is associated with the speed 4000 rpm. In the neighboring third range from 4500–5500 rpm, let the adaption value be 1.003, which is associated with the speed 5000 rpm. Then if the speed 4500 rpm is actually in the center between 4000 and 5000 rpm, the average of 1.005 and 1.003, that is 1.004, is used as the interpolated adaption value as the adaption value at this speed. Correspondingly, one can proceed, if according to the second variant, direct reference is made to the choice of a respective adaption branch.

Figure 4:
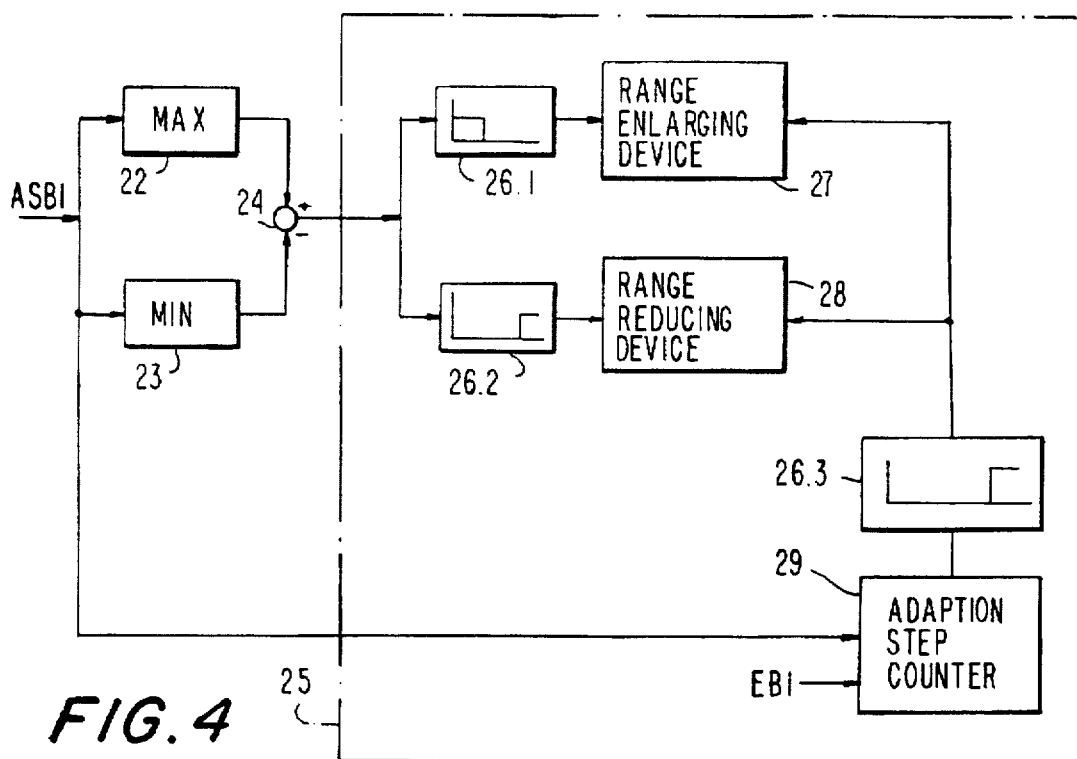
FIG. 4 is a block function diagram for a partial device for determining resonance sub-ranges in a speed range.

The modification represented in FIG. 4 is provided in order to overcome problems that stem from the above-mentioned resonance sub-ranges. This has a maximal value memory 22, a minimal value memory 23, a subtracting device 24, and a range adjusting device 25 with a first filter comparator 26.1, a second comparator 26.2, a range enlarging device 27, a range reducing device 28, a third comparator 26.3, and an adaption step counter 29. This device exists for only one segment, in the exemplary embodiment for the segment B, but respectively separate for all given speed ranges. FIG. 4 shows the case for the first speed range.

As soon as the two memories 22 and 23 receive the success signal EB1, they store the actual adaption value ASB1. In addition, the adaption step counter 29 is set at zero by this signal. From this point, the adaption step counter 29 begins to count each adaption step for the adaption value ASB1. In the maximal value memory 22, the stored value is then respectively overwritten by a new one if the new value is greater than the one stored previously. In contrast, ever smaller values are entered in the minimal value memory 23. The subtracting device 24 produces the difference between the two stored values and supplies it to the range adjusting device 25. As soon as the third comparator 26.3 determines that the count value of the adaption step counter 20 exceeds a given count value, its output signal changes from the level L to the level H. If it is determined in the first comparator 26.1, that the above-mentioned difference lies below a relatively low first threshold, then the first range is enlarged in the range enlarging device 27, for example from 1500–4000 rpm instead of from 1500–3500 rpm, as before. The three remaining ranges can be reduced in a correspondingly uniform manner. On the other hand, if the above-mentioned difference is above a higher, second threshold value, this is an indication that a resonant point is disposed in the range. From there, the range is reduced by the range reducing device 28 so that it ranges only up to 3000 rpm, for example, instead of to 3500 rpm. The other three ranges are enlarged in a correspondingly uniform manner.

Range enlargements or reductions of this kind are also carried out for the other ranges. In the end, this amounts to the fact that when for example there are two partial resonance ranges, two out of the four ranges are limited to these partial resonance ranges and the other two ranges each extend over a relatively large speed band.

In addition to being used for range adjusting, the output signal of the subtracting device 24 can also be used for other purposes, which is referred to in more detail below in connection with a running imbalance recognition.

Figure 6:
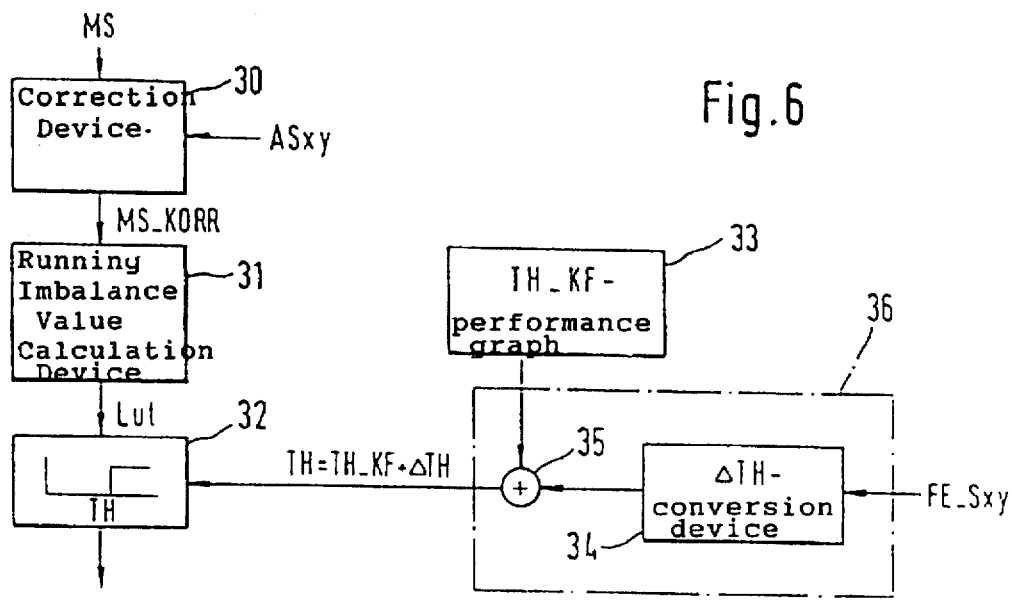
FIG. 6 is a block function diagram to illustrate how a threshold value which is used in a running imbalance test is modified depending upon the learning progress in a transmitter wheel tolerance adaption.

As already mentioned several times, the measurement signals MS output by the transmitter 11 are at the same time used to calculate a running imbalance value, which is a measure for whether excessive misfires are occurring in an internal combustion engine. The above described tolerance adaption takes place so that no mechanical tolerances of the transmitter wheel and speed-dependent tolerances influence the measurement signal in the measured value detection. Depending upon which segment x and which speed range y a measured value is currently detected for, it is corrected with the help of the affiliated adaption value ASxy for the segment length. The running imbalance value is then calculated with the measured value thus corrected. This is illustrated by FIG. 6. There, the above-mentioned correction takes place in a correction device 30 and the calculation of the running imbalance value takes place in a running imbalance value calculation device 31. The running imbalance value Lut is then compared to a threshold value TH using a running imbalance value comparator 32. As soon as the running imbalance value Lut exceeds the threshold value TH, the output signal of the running imbalance value comparator 32 changes from the level L to the level H, which indicates excessive misfires in the internal combustion engine.

It is now apparent that when tolerances of the transmitter wheel are either not adapted at all or are not yet satisfactorily adapted, the running imbalance value is increased due to tolerance-conditional measurement errors. It is therefore advantageous to embody the threshold value TH as variable in such a way that when the adaption of tolerances is still insufficient, this threshold value is higher than when the adaption is finished. To this end, the threshold value TH is composed of a performance graph threshold value TH__KF, as read from a performance graph 33, depending upon the actual values of the speed and load L of the internal combustion engine, and a threshold value change TH, which are output by a conversion device 34, depending upon the magnitude of the learning progress signal FX__Sxy. The conversion device 34 and an adding device 35, in which the signal TH__KF+TH is generated, together constitute a modification device 36, by means of which the conventionally used threshold value TH__KF is modified with the threshold value change TH.

Figure 5:
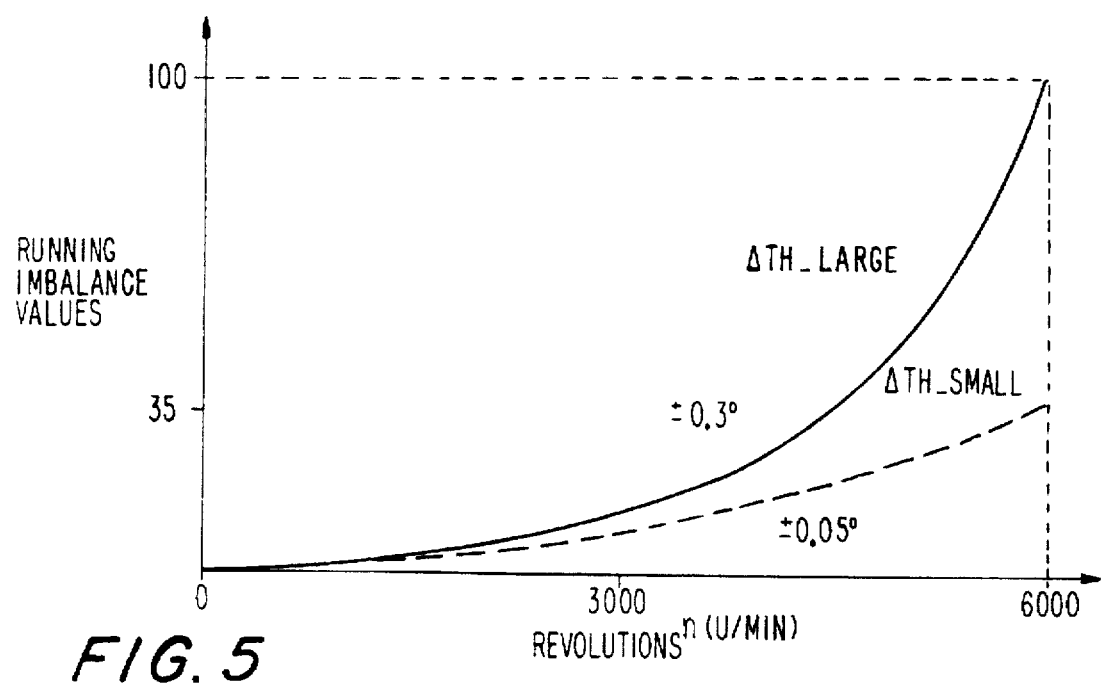
FIG. 5 is a diagram which shows how a running imbalance value is influenced by transmitter wheel tolerances depending on speed.

FIG. 5 shows how the running imbalance value changes depending on the speed, if it is required entirely due to transmitter wheel tolerances alone. It is assumed that the running imbalance value 100 is maintained at 6000 rpm when there is a tolerance of the measurement signal MS, which corresponds in angle to ±0.3° over a segment length of 120°, which is the upper mechanical tolerance. This value increases roughly exponentially, so that at 3000 rpm, it is only about 25. Now these values must be taken into account depending upon the speed at the threshold value TH so that thus when there is insufficient adaption, the threshold value change TH must have the value 25 at 3000 rpm in the exemplary case and must have the value 100 at 6000 rpm.

Figure 7:
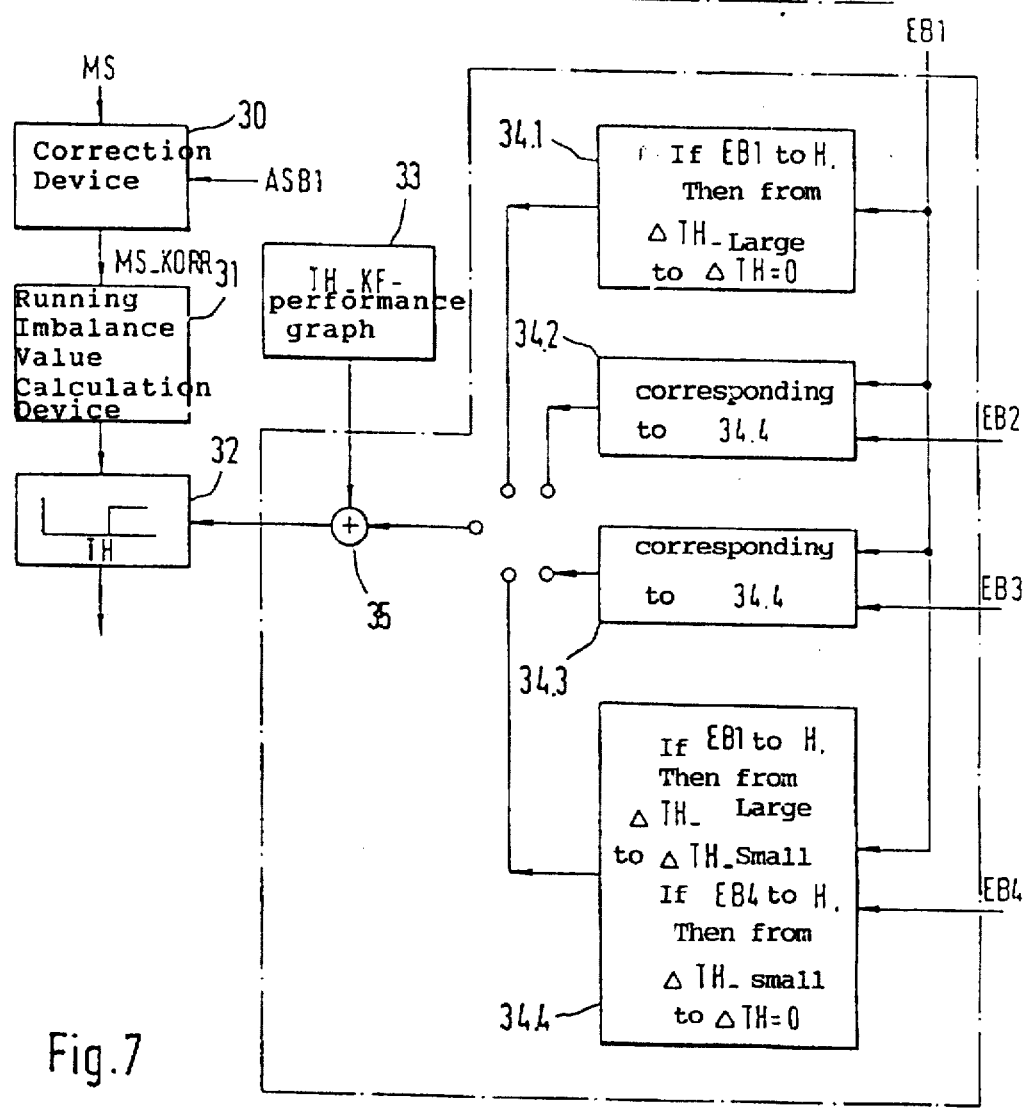
FIG. 7 is a block function diagram to illustrate how the threshold value which is used in a running imbalance test is modified depending upon adaption results for different speed ranges.

To arrive at the following explanation of the function block diagram of FIG. 7, let it be assumed that the adaption for a range is finished to the point that the success signal Exy, for example the success signal EB1, is output. Hence the mechanical and speed-conditional tolerances are adapted for this range, in this case for the lowest speed range for segment B. The adaption of the mechanical tolerances also applied at the same time to the other speed ranges. That means that it is sensible to accept the value adapted for the one speed range for the other speed ranges as well, in which the adaption has not yet progress so far that the affiliated success signal is output. However, another speed-conditional adaption can be required in this other speed range, for example the speed range 2 for the same segment B; here, therefore, the threshold value change TH cannot be brought back to zero. However, it can be reduced to considerably smaller values as in the case of large mechanical tolerances. Tests have shown namely that at 120°, the speed-conditional tolerances are only approximately ±0.05°. A corresponding curve for running imbalance values, as they ensue only in the presence of an error of this kind, is shown in FIG. 5 with a dashed line. It can be seen that at 6000 rpm, instead of the running imbalance value of 100, only the value of roughly 35 appears and at 3000 rpm, only the value of roughly 8 appears. The threshold value change TH can be chosen as correspondingly small.

A partial device which uses the above-explained knowledge is shown in FIG. 7. This device differs from the one in FIG. 6 by the fact that in addition to the adding device 35, the modification device 36 now has four modification sub-devices 34.1–34.4 instead of the one modification device 34. All four modification sub-devices receive the success signal EB1 for the segment B and for the lowest speed range that clearly carries out the adaption the fastest according to experience. As soon as this success signal changes to a high level, the threshold value change TH is converted from the progression TH__GROSS, which is shown in FIG. 5 with the solid line, to the value TH=0. On the other hand, in the three other modification sub-devices 34.2–34.4, a switch is made to the progression TH__KLEIN, which is shown in FIG. 5 in dashed lines. In these three ranges, TH is set to zero only when the respective success signal EB2, EB3, or EB4 changes to a high level.

The variants of FIGS. 6 and 7 can also be combined. That means that in the modification sub-devices 34.1–34.4 in FIG. 7, not only one large and one small threshold value change per speed can be used, but that—as in the modification device 34 in FIG. 6—the respectively used threshold value change can be set depending upon the value of the learning progress signal FE__Sxy.

In the first modification sub-device 34.1, when the success signal EB1 is output, it is further possible to not immediately convert to the threshold value change zero, but first to wait for the test, which is described in FIG. 4, for a relatively large band width of adaption values within a speed range. That means that when the success signal EB1 changes to a high level, at first only one conversion from the large to the small threshold value change is carried out. Only if in the course of the test explained in conjunction with FIG. 4 it is found that for the entire affiliated speed range—here range 1—a very narrow-band adaption is possible, is a switchover to the threshold value change of zero made. If on the other hand, the adaption values within the range cover a relatively wide band due to a resonance point, the modification of the threshold value TH__KF read from the performance graph 33 is retained, with the small threshold value change TH__KLEIN.

For the sake of completeness, it should be noted that in FIG. 7, the modification device 36' is represented as being applicable to a single segment, namely segment B. It must be noted that there need not be other directly corresponding modification devices, if—namely in an application where all segments are used—adaption is performed to the same extent timewise so that at the times determined by the modification device 36', corresponding changes can be carried out in connection with the other segments as in connection with segment B. If on the other hand, the individual segments in a particular application show widely differing learning progresses, in such a case, a modification device must be provided for each segment.

It should also be noted that calculating running imbalance values does not depend upon detecting speeds in absolute form; speed changes must merely be very precisely determined. Therefore, it is very advantageous for a segment to arbitrarily assume a certain length and to detect only differences in length of the at least one other segment in comparison to the length of this chosen segment. Then, all the described adaptions and threshold value modifications have to be performed only for one fewer segment than the total number of segments.

We claim:

1. A device for adaption of tolerances in the measurement of angular segment lengths of a segmented transmitter wheel, comprising a transducer aligned with regard to the transmitter wheel so that at each segment limit it outputs a measurement signal; one respective segment length calculation device provided at least for each segment but one and determining a segment length of the associated segment from two successive measurement signals to output a corresponding segment length value; one respective averaging device provided for each segment and averaging the segment length values for the associated segment out to an adaptation value; a speed determining device, each of the averaging devices having at least two averaging sub-devices each associated with a speed range; and a speed selector provided for each segment and operating so that each averaging sub-device only receives a kind of segment length values which apply to the speed range associated with it.

2. A device as defined in claim 1, and further comprising a learning process determining device which is associated with at least one averaging sub-device and determines how far the adaptation has been carried out in the associated averaging sub-device to output an affiliated learning progress signal.

3. A device as defined in claim 2, and further comprising a comparison device associated with each learning progress determining device and comparing the learning progress signal with a given threshold value to output a success signal when the learning progress signal crosses over the threshold value.

4. A device as defined in claim 3, and further comprising a maximal value memory for at least one chosen segment and for each averaging sub-device associated with it, which maximal value memory, upon an appearance of the success signal, is set to the actual adaptation value of the associated averaging sub-device and then stores the maximal occurring adaption value from the associated averaging sub-device; a minimal value memory for at least one chosen segment and for each averaging sub-device associated with it, which minimal value memory, upon an appearance of the success signal, is set to the actual adaption value of the associated averaging sub-device and then stores the minimal occurring adaption value from the associated averaging sub-device; and a subtracting device which determines a difference between the maximal value and the minimal value and outputs a corresponding difference signal.

5. A device as defined in claim 4, and further comprising a range adjusting device which after the appearance of the success signal, carries out the adaption so far that a given test condition is fulfilled for an averaging sub-device, with one of a width of a given speed range and a spacing of at least one given speed which is adjacent to another given speed, by means of which a new predetermined value is obtained if a difference signal for this averaging sub-device falls below a threshold is increased, or reduced when it exceeds a threshold.

6. A device as defined in claim 2, and further comprising a modification device associated with each averaging sub-device so that it modifies a threshold value which is used to compare with a value which is calculated by using the adaption value output by the relevant averaging sub-device, depending upon the magnitude of the learning progress signal.

7. A device as defined in claim 6, and further comprising a plurality of modification devices which are associated with a segment of the transmitter wheel so that only when one of the associated comparison devices outputs a success signal for the first time, the modification devices, which are not affiliated with the comparison device which has output the success signal, reduce the threshold value from a high initial value to a low value.

8. A device as defined in claim 7, wherein at least one modification device is formed so that it sets the threshold value change to a value zero when the comparison device associated with it outputs the success signal.

9. A device as defined in claim 7, wherein at least one modification device is formed so that when the comparison device associated with it outputs the success signal, it first reduces the threshold value from a high initial value to a low value and then sets the threshold value change to zero when a subtracting device output the difference signal and this is below a given comparison value.

10. A device for adaption of tolerances in the measurement of angular segment lengths of a segment transmitter wheel, comprising a transducer aligned with regard to the transmitter wheel so that at each segment limit it outputs a measurement signal; one respective segment length calculation device provided at least for each segment but one and determining a segment length of the associated segment from two successive measurement signals to output a corresponding segment length value; one respective averaging device provided for each segment, and averaging the segment length values for the associated segment out to an adaption value; a speed determining device, each of the averaging devices having at least two averaging sub-devices each associated with a speed; and a weighting device provided for each segment and operating so that with each segment length value, each averaging sub-device receives a weighting factor, with which the averaging is to be carried out and which is smaller the more the actual speed is removed from the speed associated with the averaging sub-device.

11. A device as defined in claim 10, and further comprising a learning process determining device which is associated with at least one averaging sub-device and determines how far the adaptation has been carried out in the associated averaging sub-device to output an/affiliated learning progress signal.

12. A device as defined in claim 11, and further comprising a comparison device associated with each learning progress determining device and comparing the learning progress signal with a given threshold value to output a success signal when the learning progress signal crosses over the threshold value.

13. A device as defined in claim 12, and further comprising a maximal value memory for at least one chosen segment and for each averaging sub-device associated with it, which maximal value memory, upon an appearance of the success signal, is set to the actual adaptation value of the associated averaging sub-device and then stores the maximal occurring adaption value from the associated averaging sub-device; a minimal value memory for at least one chosen segment and for each averaging sub-device associated with it, which minimal value memory, upon an appearance of the success signal, is set to the actual adaption value of the associated averaging sub-device and then stores the minimal occurring adaption value from the associated averaging sub-device; and a subtracting device, which determines a difference between the maximal value and the minimal value and outputs a corresponding difference signal.

14. A device as defined in claim 13, and further comprising a range adjusting device which after the appearance of the success signal, carries out the adaption so far that a given test condition is fulfilled for an averaging sub-device, with one of a width of a given speed range and a spacing of at least one given speed which is adjacent to another given speed, by means of which a new predetermined value is obtained if the difference signal for this averaging sub-device falls below a threshold is increased, or reduced when it exceeds a threshold.

15. A device as defined in claim 11, and further comprising a modification device associated with each averaging sub-device so that it modifies a threshold value which is used to compare with a value which is calculated by using the adaption value output by the relevant averaging sub-device, depending upon the magnitude of the learning progress signal.

16. A device as defined in claim 15, and further comprising a plurality of modification devices which are associated with a segment of the transmitter wheel so that only when one of the associated comparison devices outputs a success signal for the first time, the modification devices, which are not affiliated with the comparison device which has output the success signal, reduce the threshold value from a high initial value to a low value.

17. A device as defined in claim 16, wherein at least one modification device is formed so that it sets the threshold value change to a value zero when the comparison device associated with it outputs the success signal.

18. A device as defined in claim 16, wherein at least one modification device is formed so that when the comparison device associated with it outputs the success signal, it first reduces the threshold value from a high initial value to a low value and then sets the threshold value change to zero when a subtracting device output the difference signal and this is below a given comparison value.

* * * * *